April 12, 1955     O. L. EDWARDS     2,705,831
PLUG PULLER COUPLING
Filed Sept. 30, 1950
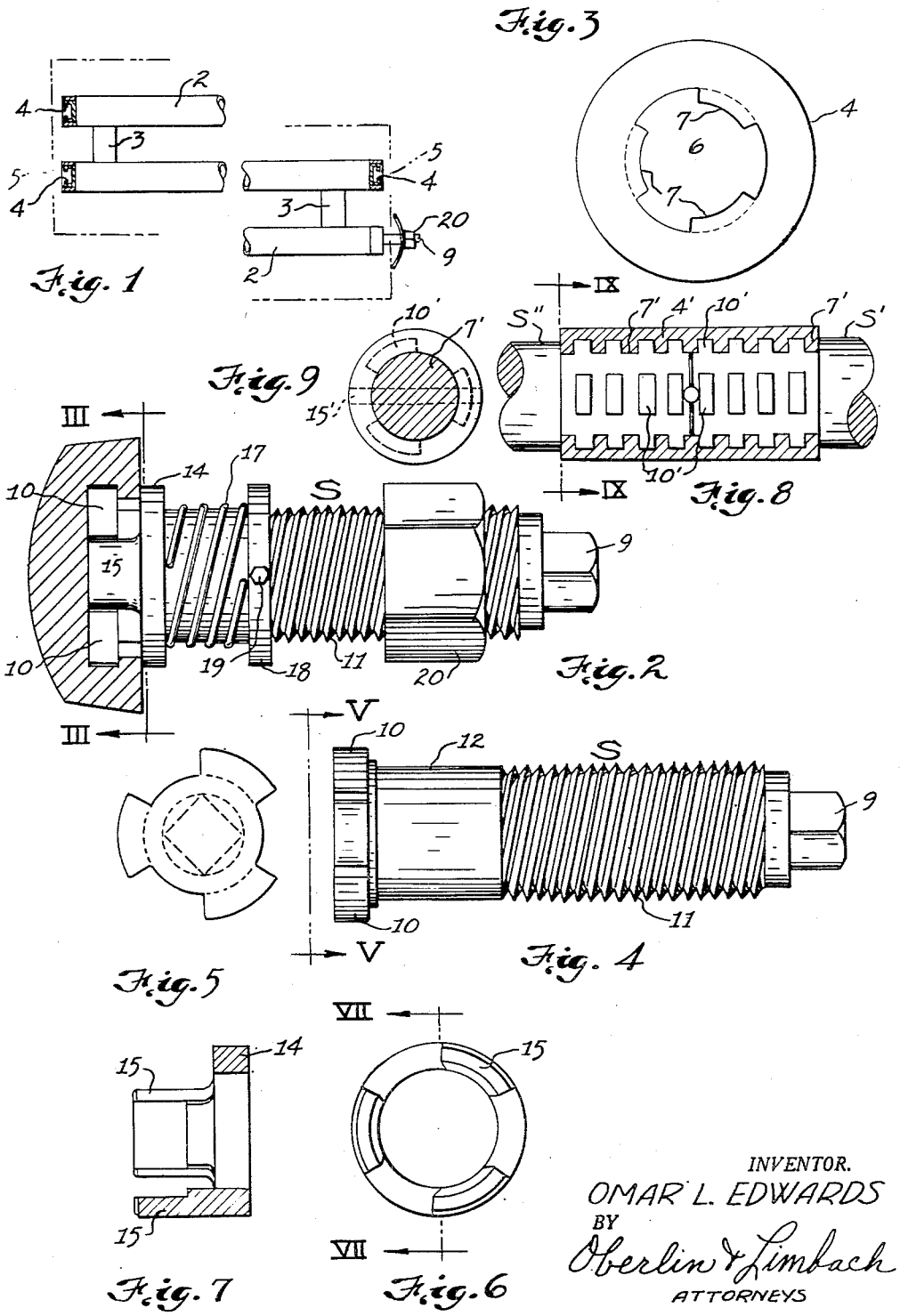
INVENTOR.
OMAR L. EDWARDS
BY
Oberlin & Limbach
ATTORNEYS United States Patent Office 2,705,831
Patented Apr. 12, 1955

2,705,831

PLUG PULLER COUPLING

Omar L. Edwards, Maple Heights, Ohio, assignor to The Standard Oil Company, Cleveland, Ohio, a corporation of Ohio Application September 30, 1950, Serial No. 187,778

1 Claim. (Cl. 29—266)

In certain tubular type apparatus, such as pipe stills, heaters for liquids, certain boiler tube forms, etc., it has been customary to provide the tubes with clean-out openings in the form of plugs driven into the end of the tube. To remove such plugs to permit cleaning, the plugs have been provided with tapped and threaded recesses into which a stem could be inserted and then by means of a nut on the stem turning against a suitable abutment, such as a plate or spider, the plug would be drawn out. Such threaded recess in the plug has been subject to corrosion and destruction after very few usages, and in some cases resort has been had to welding the stem to the plug. This however has been unsatisfactory. In general, it is important that a puller stem be quickly and easily connectable to the plug to be withdrawn, and any connecting means should be as immune as possible to damage from corrosive gases such as are encountered in furnace chambers in which tubular apparatus of the kind concerned is heated. In accordance with the present invention, a construction is had which may be very easily and quickly connected up and with effective engagement, and withal the device is particularly durable. Other objects and advantages of the invention will appear from the following description.

To the accomplishment of the foregoing and related ends, said invention then comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

In said annexed drawing:

Fig. 1 is a fragmentary semi-schematic sectional view of tubes of a pipe still showing the taper plugs and puller coupling adaptable as in the present invention;

Fig. 2 is a side elevation, partly in section, of the plug and connected puller;

Fig. 3 is an end view of the plug looking in the direction of the arrows III, Fig. 2;

Figs. 4 and 5 are respectively side elevational and end views of the puller stem;

Fig. 6 is an end elevation of the stem locking collar;

Fig. 7 is an axial section of the same taken on the line VII, Fig. 6;

Fig. 8 is an elevational view, partly in section, showing a modification; and

Fig. 9 is a section taken on a plane substantially indicated by line IX, Fig. 8.

A plurality of tubes 2, Fig. 1, connected at 3 serially are provided at the respective end openings with wedge plugs 4, these being accessible through openings in the housing 5, normally closed by hand-hole covers or plates as well known and as need not be detailed here. Each tapered plug 4, as seen in Fig. 3 has a recess 6 in its outer end, provided with lugs 7 directed radially inwardly, thus forming undercuts within which the puller coupling may engage the plug for its withdrawal. As seen in Fig. 2, the coupling is in such manner connected to the plug 4. The coupling comprises a rod or stem S with cylindrical body having one end squared as at 9, as for a wrench-hold, and the other end provided with radial lugs 10, while intermediate the ends there is a threaded portion 11 and a plain portion 12. The lugs 10 are of a size to axially slip between the lugs 7 of the plug 4, whereupon by rotating slightly (one-sixth of a turn in the particular form shown) then engage under the lugs 7, as shown in Fig. 2. To prevent the disengagement of the stem from the plug by inadvertent rotation a locking collar 14 is arranged axially slidable on the stem portion 12, and such locking collar has axially extending lugs 15, shown more clearly at Fig. 7, which are proportioned to easily enter between the lugs 7 of the plug and the lugs 10 of the stem, thereby blocking against the possibility of the stem being rotated relatively to the plug. A spring 17 between the locking-collar 14 and an abutment 18 serves to normally urge the locking collar into holding position. The abutment 18 may conveniently be a ring or collar adjustable on the stem portion 12 and held in position by a set screw 19. A drawing-nut 20 in screw threaded engagement with the stem portion 11 serves to operate against a suitable abutment for pulling the assembly, as shown at Fig. 1.

In operation: The stem assembly is connected to the plug to be drawn, by introducing the lugs 10 axially between the lugs 7 on the plug, the locking collar 14 being retracted against its spring, and then by rotating the stem by means of the squared end 9 through an arc sufficient to bring the stem-lugs 10 under the lugs 7 of the plug the lugs are engaged; and next the locking collar is allowed to spring into position with its lugs 15 in the spaces between the lugs 7 of the plug. Then, an abutment plate or spider A is placed over the stem and against the housing, and nut 20 is screwed onto the stem and is turned up against the abutment. The latter being stationary, motion is imparted to the stem and it draws the plug free. After the tube is suitably cleaned, the plug 4, free from the withdrawing stem, is replaced, being driven tight by suitable blows.

In some cases where space permits, a plurality of the lugs 10', Figs. 8 and 9, may be provided on the stem or rod, such plurality of lugs being in repeat series similarly oriented. And, the coacting external element correspondingly is provided with inwardly-directed lugs, whereby, as described foregoing, the element carrying the outwardly-directed lugs may be inserted axially in the element having the inwardly-directed lugs 7'. Thus, the element S' with its aligned series of lugs 10' may be axially inserted between the aligned series of inwardly directed lugs 7' on the other member 4', and then by partial rotation the lugs 10' will be engaged behind the lugs 7'. With a plurality of lugs also, connection may be made to a further rod-like element S'' which is provided with a series of lugs 10', and by arrangement so that the inwardly-directed lugs 7' are between the series of lugs 10' on the member S'', the member 4' can be axially assembled onto the end of member S'' and by partial rotation interlock the lugs 10' and 7'. Again, to lock the assembly, locking means is provided, and this may conveniently take the form of a tapered pin 15, which is driven into a corresponding hole through the collar 4' and the mating ends of the rod-like elements S'', S'. To disassemble this, the locking pin is driven out, and by partial rotation of the collar 4' removal from one of the elements, as S'', may be effected axially, and then by partial relative rotation the collar may be freed for axial removal with respect to the other element.

Other modes of applying the principle of the invention may be employed, change being made as regards the details described, provided the features stated in the following claim or the equivalent of such be employed.

I therefore particularly point out and distinctly claim as my invention:

A puller for a plug of a type having a socket and lugs spaced around and directed radially inwardly from the edge of the socket; said puller comprising a stem, a flat circular head on one end thereof defined by a plurality of spaced radial lugs for entrance into the socket of the plug through the spaces between the lugs outlining the plug socket, said head lugs having flat parallel forward and rear faces in planes perpendicular to the axis of the stem and having radially directed outer edge circular faces concentric with the stem and having a common radius, a locking collar comprising an annulus encircling the stem and having a plurality of lugs extending forwardly from the side thereof adjacent to the head lugs, the said side of the collar between the collar lugs having a flat face substantially paralleling the rear faces of the head lugs between which rear faces and the said flat face of the collar the socket lugs are secured when the puller and a plug are coupled together, said collar lugs having a width substantially equal to the spaces between the head lugs between which head lugs the collar lugs are designed to position, a second collar encircling the stem and spaced from the locking collar, means securing the second collar to the stem, a coil spring encircling the stem between the collars and urging the locking collar toward the head lugs, said stem being adapted to have an abutment element mounted thereon on the side of the second collar remote from the stem head, and means carried by the stem and adapted to engage an abutment element mounted thereon for urging the abutment element against an abutment surface.

References Cited in the file of this patent

UNITED STATES PATENTS

| Number | Name | Date |
|---|---|---|
| 511,610 | Gregg | Dec. 26, 1893 |
| 531,334 | Ross | Dec. 25, 1894 |
| 900,120 | Parker | Oct. 6, 1908 |
| 1,006,144 | Stock | Oct. 17, 1911 |
| 1,333,437 | Monroe | Mar. 9, 1920 |
| 1,705,789 | Steirly | Mar. 19, 1929 |
| 1,728,248 | Naggy et al. | Sept. 17, 1929 |
| 2,113,508 | Guinn | Apr. 5, 1938 |
| 2,448,547 | Purdy | Sept. 7, 1948 |